United States Patent [19]

Kardinal

[11] 4,437,797
[45] Mar. 20, 1984

[54] PNEUMATIC MAIL STATION FOR THE DELIVERY, PNEUMATICALLY DECELERATED RECEPTION AND TRANSIT OF PNEUMATIC DISPATCH CASES

[75] Inventor: Hans J. Kardinal, Berlin, Fed. Rep. of Germany

[73] Assignee: Siemens Aktiengesellschaft, Berlin & Munich, Fed. Rep. of Germany

[21] Appl. No.: 339,420

[22] Filed: Jan. 15, 1982

[30] Foreign Application Priority Data

Jan. 19, 1981 [DE] Fed. Rep. of Germany ....... 3102248

[51] Int. Cl.³ .............................................. B65G 51/32
[52] U.S. Cl. .................... 406/110; 406/63; 406/74
[58] Field of Search .................... 406/110–112, 406/63, 74, 182

[56] References Cited

U.S. PATENT DOCUMENTS 3,998,405 12/1976 Carlier ................................ 406/112

FOREIGN PATENT DOCUMENTS 353172 10/1979 Austria .
2338774 2/1975 Fed. Rep. of Germany ...... 406/110
2247402 5/1975 France ................................. 406/110

*Primary Examiner*—John J. Love
*Assistant Examiner*—L. E. Williams
*Attorney, Agent, or Firm*—Hill, Van Santen, Steadman & Simpson

[57] ABSTRACT

In an exemplary embodiment, a reception tube chamber closed at one end and a transit tube chamber open at both ends can be displaced in common, whereby, in the reception position of the pneumatic mail station, the reception tube chamber closed at one end is located with its open end area in front of a tube section associated with a forwarding tube path entering the pneumatic mail station from below. The disclosure is especially favorable in pneumatic mail systems with relatively large or, respectively, heavy pneumatic dispatch cases which are to be received in the pneumatic mail station pneumatically decelerated.

21 Claims, 5 Drawing Figures

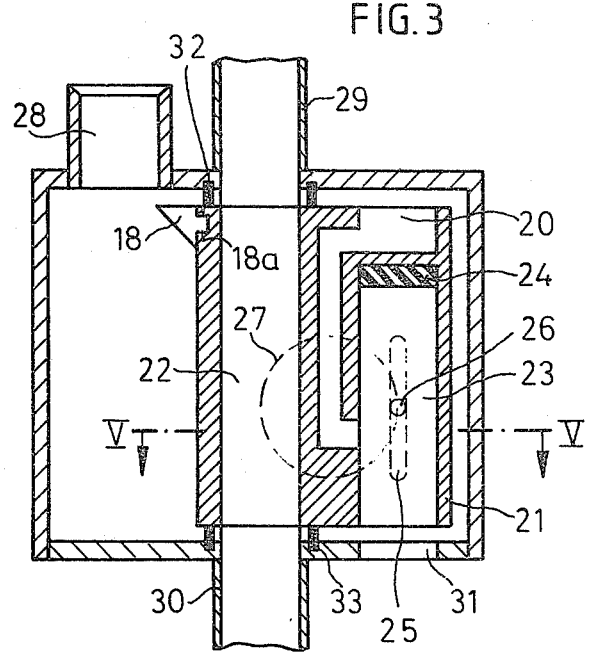
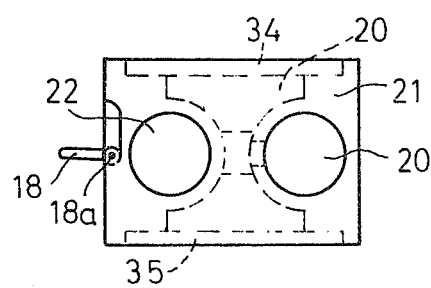
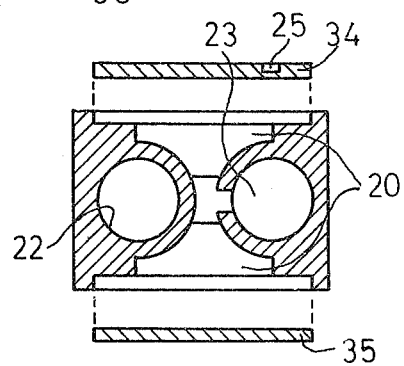

PNEUMATIC MAIL STATION FOR THE DELIVERY, PNEUMATICALLY DECELERATED RECEPTION AND TRANSIT OF PNEUMATIC DISPATCH CASES

BACKGROUND OF THE INVENTION

The invention relates to a pneumatic mail station for the delivery, reception and transit of pneumatic dispatch cases with two pneumatic tube sections placed at mutually opposite limiting walls of the pneumatic mail station for coupling with an incoming forwarding tube path and an outgoing forwarding tube path as well as with an insertion or inward transfer opening for the introduction of pneumatic dispatch cases which are to be sent and an unloading or outward transfer opening for the discharge of received pneumatic dispatch cases in the same limiting surfaces and with a reception tube chamber shiftable into alignment with the pneumatic tube section associated with the incoming forwarding tube path for the reception of pneumatic dispatch cases, there being allocated to said reception tube chamber a closure device functioning at one end of the chamber in the manner of creating an air pillow decelerating the pneumatic dispatch case and an air conduit which, in the reception position of the reception tube chamber, pneumatically connects the incoming pneumatic tube section with the outgoing forwarding pneumatic tube section.

Given such a pneumatic mail station—known from the Austrian Pat. No. 353,172, FIG. 1 as well as page 4, line 33 through page 5, line 12—the closure device is designed as an electromagnetically or, respectively, motor-driven slide. The slide comprises a movable plate which is guided in a slide housing. For this purpose, the slide housing is rigidly connected to the tube chamber and is displaced in common with said tube chamber. The actual drive of the tube chamber ensues via a cog wheel mechanism which engages in the central area of the tube chamber.

Given vertical disposition of the tube chamber—the usual standard position of pneumatic mail stations—the slide is situated in the lower portion of the station. The pneumatic tube sections for the incoming and the outgoing forwarding tube paths have holes near the upper and lower boundaries of the station housing which discharge into the air conduit. A clack valve is situated in the central portion of the air conduit, said clack valve being opened for the air streaming from the top toward the bottom but being closed for the opposite air flow direction. Upon arrival of a pneumatic dispatch case from the upper transmission tube path, the slide is run into the clear cross-section of the tube chamber so that the stream of conveying air is interrupted at the tube chamber. The stream of conveying air proceeds through the holes in the pneumatic tube sections and the air conduit, so that an effective pneumatic drive is available for the incoming traveling tube until the pneumatic dispatch case enters the area of the air holes of the incoming pneumatic tube section. The deceleration path in which the pneumatic dispatch case creates an air pillow in front of it which decelerates it extends from this area to the level of the slide.

Pneumatic dispatch cases arriving from below first traverse the area of the open slide, actuate a contact after the traversal and thus redirect the direction of the conveying air stream on the one hand and, on the other hand, actuate the slide drive so that the tube chamber is closed off at the lower portion thereof. Subsequently, the same operational sequence occurs as in the arrival of a pneumatic dispatch case entering the pneumatic mail station from the top.

In the known pneumatic mail station, thus, the same reception operation is provided given the arrival of pneumatic dispatch cases arriving in the pneumatic mail station both from the top and from below, the pneumatic dispatch case moving from top toward bottom in the final phase of said reception operation. This is to be viewed as being disadvantageous insofar as there is an increasing desire in the planning of contemporary pneumatic mail systems to have the pneumatic dispatch cases enter the pneumatic mail station from below, because this makes it easier to conceal or, respectively, cover the pneumatic mail tubes by means of covers, office furniture or counters. A further disadvantage is to be seen in that the pneumatic deceleration is imperfect insofar as lightweight pneumatic dispatch cases are better and more effectively decelerated than heavy pneumatic dispatch cases; given the same air velocity in tube lines proceeding down from the top, heavy pneumatic dispatch cases exhibit higher conveying speeds than lightweight pneumatic dispatch cases. In order to also be able to effectively decelerate heavy and, thus, faster pneumatic dispatch cases, an air conduit is provided for the known pneumatic mail station given high conveying speeds of heavy pneumatic dispatch cases, said air conduit emerging from the pneumatic mail station and, in an area lying correspondingly far above the pneumatic mail station, discharging into the forwarding tube entering the pneumatic mail station from the top.

SUMMARY OF THE INVENTION

The object on which the invention is based resides in simplifying the drive devices necessary for the operation of the station and reducing their mechanical load due to pneumatically decelerated pneumatic dispatch cases which are received. At the same time, the possibility should be created of achieving a pneumatic deceleration which is proportional to the kinetic energy of incoming pneumatic dispatch cases. This object is inventively achieved in that a first reception tube chamber is terminated in that end area adjacent to the outgoing forwarding tube path and is structurally connected with a second tube chamber which extends parallel to it and can be displaced in common with it, said second tube chamber being in the alignment with both pneumatic tube sections in one position and being in alignment with the insertion or inward transfer opening in another position; and in that the air conduit connects at one end into the first tube chamber and can be displaced in common with the first tube chamber and the second tube chamber in such manner that, given the position of the second tube chamber in alignment with the two pneumatic tube sections, the access of the air conduit to at least the pneumatic tube section for the outgoing forwarding tube is blocked but, in contrast thereto, is released given the position of the first tube chamber in alignment with the two pneumatic tube sections.

The significant advantage of the inventive pneumatic mail station is in the augmentation of the cylindrical tube chamber by a second cylindrical tube chamber which is only exploited for the transit position of the pneumatic mail station; thus, the first tube chamber can be designed entirely for the object of pneumatic deceleration of pneumatic dispatch cases without consideration of the transit conditions of pneumatic dispatch cases. What is thereby made particularly possible is that the closure device no longer need be designed as a separately driven slide but can be designed as a fixed termination of the first tube chamber. Thereby, there are possibilities of minimizing both the forces exerted on the guidance and the drive of the two tube chambers in the final phase of the deceleration, i.e., when the pneumatic dispatch case strikes the closed end of the first tube chamber, as well as minimizing the development of noise connected therewith. In this context, an advantageous development of the invention provides that the closed end of the first tube chamber is equipped with an elastic buffer.

The inventive pneumatic mail station can be built in in any desired position. Thus, for example, it can lie horizontally or be vertically disposed in such manner that the open end of the first tube chamber faces either up or down. It is to be viewed as being preferred that the pneumatic tube section for the incoming forwarding tube path is disposed at the lower limiting wall. Thereby, the pneumatic dispatch cases are respectively introduced into the pneumatic mail station from below in the final phase of their reception. When a pneumatic dispatch case first enters the pneumatic mail station from the top, then the pneumatic mail station is operated in such manner that the second tube chamber is placed in alignment with the incoming and the outgoing forwarding tube paths, so that the incoming pneumatic dispatch case travels through the pneumatic mail station. After the pneumatic dispatch case has left the pneumatic mail station in the downward direction, a control device for the drive of the two tube chambers is influenced by means of a controller contact actuated by the pneumatic dispatch case and, thus, the introduction of the first tube chamber closed at one end is initiated so that the first tube chamber moves into the alignment with the lower pneumatic tube section. Subsequently, the direction of the driving air stream is reversed, whereby this air stream flows within the pneumatic mail station through the air conduit; thus, the pneumatic dispatch case is introduced into the first tube chamber from below. In order to be able to derive necessary setting operations for the tube chamber from this operation as well, a further advantageous development of the invention provides that a contact actuatable by pneumatic dispatch cases is disposed at least in the area of the tube chamber.

When the pneumatic mail station represents the end of a forwarding tube path which is traversed in a reversing bidirectional mode, then an air conduit can be connected to the pneumatic tube section which is associated with the upper fowarding tube path for a system with separated incoming and outgoing paths. If, in contrast thereto, the pneumatic mail station lies at the end of a tube path which leads to the station from above, then the pneumatic mail station is disposed in such manner than the open end of the first tube chamber points up. Both pneumatic dispatch cases which are to be sent out as well as incoming pneumatic dispatch cases then respectively pass through the transfer opening which is directed upwardly in this case.

In order to achieve as effective as possible a pneumatic deceleration of the pneumatic dispatch cases entering the pneumatic mail station, it is provided that the air conduit junctions with the first tube chamber in an area which lies close to the open end of said first tube chamber. Thus, a maximum length of the actual deceleration path is achieved.

The necessary sealing of the two pneumatic tube sections in the various positions of the tube chambers is achieved in that both tube chambers are disposed in a carrying body which has end faces which extend parallel to the adjacent limiting walls at least near the boundaries of the open ends of the two tube chambers. These end faces can also be employed for the seal, whereby one must see to a corresponding material match. This material match can also ensue in that the end faces represent separate structural parts which are secured to the carrying body. In conformity with this design of the two tube chambers or, respectively, their attachment in a common carrying body, it is provided that sealing rings encompassing the pneumatic tube sections for the incoming and for the outgoing forwarding tube paths are disposed at the limiting walls.

These sealing rings can be glued on; it is preferred, however, that annular grooves in the limiting walls accept the sealing rings. In order to achieve a faultless seal given only a slight mechanical loading of the sealing rings, it is provided that the sealing rings (which are resiliently seated or themselves of resilient material) are pressed against the end faces of the carrying body.

Insofar as a separate access to the pneumatic tube section for the outgoing forwarding tube path is allocated to the air conduit, the corresponding access opening must also be sealable. The same type of sealing devices can be provided for this purpose. An advantageous further development of the invention, however, makes additional sealing devices for the air conduit unnecessary in that the first tube chamber has a shorter length than the second tube chamber and the area between the closed end of the first tube chamber and the limiting wall accepting the pneumatic tube section for the outgoing forwarding tube path is at least partially incorporated in the air conduit. Since the air conduit is only meant to exhibit a connection to the outgoing forwarding tube path when the first tube chamber is placed in the alignment of the incoming forwarding tube path, the end of the air conduit is brought into the area of the outgoing forwarding tube path by means of this configuration of said air conduit.

A realization of the combination of the two tube chambers and the incorporation of the air conduit into the carrying body which is particularly favorable in terms of structure and manufacturing technology is made possible according to a further development of the carrying body in that the carrying body is designed as a one-piece structural part in which the air conduit is also worked out in addition to the two tube chambers. This structural part can, for example, be an injection molded part or it can be manufactured in a corresponding form as a structural foam part. This design as a single-piece structural part produces a pronounced stiffness of the carrying body and, thus, a sufficient assurance for the reliability of the drive, the guidance and the sealing at the carrying body.

It is to be regarded as being particularly favorable in view of the required dimensions of the pneumatic mail station that the air conduit is arranged at least partially in the area between the two tube chambers. Thus, the lateral dimensions of the carrying body are essentially determined by the sum of the diameters of the two tube chambers and the thickness of the wall areas surrounding them, whereas the air conduit requires no additional widening. In order to nonetheless achieve a sufficiently large interior cross-sectional area of the air conduit and to avoid the necessity of accepting unnecessary pressure losses due to a throttling effect of the air conduit, said air conduit preferably exhibits cross-sectional dimensions for air flow which increase from its central area. Thus, the lateral limiting walls of the air conduit follow the course of the tube chambers.

A further significant development of the invention likewise relates to the necessary dimensions of the pneumatic mail station. It is provided that the carrying body is supported and driven so as to be linearly displaceable. Thus, the dimensions of the pneumatic mail station in a direction perpendicular to the axis of the tube chamber are prescribed by the diameter of the tube chamber or, respectively, by the width of the carrying body. In the displacement direction of the carrying body (which is perpendicular to the axes of the tube chambers), a dimension derives which is somewhat larger than three tube chamber diameters insofar as the inward transfer opening for pneumatic dispatch cases to be sent out lies at the one side and the outward transfer opening for received pneumatic dispatch cases lies at the other side of the axes of the pneumatic tube sections associated with the incoming and outgoing forwarding tube paths. According to an advantageous further development of such a carrying body which is supported and driven so as to be linearly displaceable, the carrying body exhibits a straight guidance means in which a dog secured to the crank disk of a crank mechanism engages. Thus, particularly favorable drive conditions and, in particular, a precise fixing of the respective home positions of the two tube chambers are achieved. As is known, a sinusoidal relationship exists between the uniform rotary motion and the displacement motion of a crank mechanism, said relationship being responsible for the slow and exact introduction of the carrying body into the home position.

The number of necessary home positions can be kept small in that the distance between the axes of the two tube chambers is identical to the distance between the axis of the inward transfer opening and the axis of the pneumatic tube sections. It is thereby achieved that the second tube chamber is precisely in alignment with the inward transfer opening when the first tube chamber has had its open end introduced into alignment with the pneumatic tube section associated with the incoming forwarding tube path. A similar effect is achieved in that the distance between the axes of the two tube chambers is identical to the offset between the axis of the outward transfer opening and of the pneumatic tube section associated with the incoming forwarding tube path. Thus, the first tube chamber is situated precisely in alignment with the outward transfer opening when the second tube chamber has been introduced into alignment with the pneumatic tube sections associated with the incoming and the outgoing forwarding tube paths.

What is achieved overall with these measures is that the pneumatic mail station only requires two working positions. In the one working position, a pneumatic dispatch case can be introduced into the pneumatic mail station and a pneumatic dispatch case can be received at the same time; in the second position, a pneumatic dispatch case can travel through the pneumatic mail station and a previously received pneumatic dispatch case can be transferred out at the same time.

The automatic outward transfer of a previously received pneumatic dispatch case, given displacement of the carrying body and introduction of the open end of the first tube chamber into alignment with the outward transfer opening is desirable but, in contrast thereto, an inward transfer of a pneumatic dispatch case stored at the inward transfer location, in this position of the carrying body must be prevented. An inward transfer in this position of the carrying body would only be admissible if the carrying body were to have a third tube chamber next to the second tube chamber, and were shiftable to a further position which places the second tube chamber in alignment with the outward transfer opening and conducts a pneumatic dispatch case stored in the third chamber next to the second tube chamber into alignment with the incoming and outgoing forwarding tube paths. Since this would lead to an increase in the dimensions of the pneumatic mail station in the displacement direction, the coemployment of the second tube chamber as the location for inward transfer for pneumatic dispatch cases to be sent out is preferred.

In this context, it is provided that the carrying body carries a blocking detent in the area of its end face facing the limiting wall having the inward transfer opening, said blocking detent projecting at least slightly into an aligned blocking relationship relative to the inward transfer opening. Thus, the end face of the pneumatic dispatch case partially rests against this blocking detent forming a component of the carrying body. When the carrying body is displaced, the end face of the case slides on the end face associated with the carrying body until the second tube chamber is in alignment with the inward transfer opening. Since the blocking detent projects laterally in comparison to the second tube chamber in the displacement direction, the limiting wall of the pneumatic mail station which is perpendicular to the displacement direction must lie at a corresponding distance beyond the inward transfer opening so as not to impede the undisrupted displacement of the carrying body. In order to avoid unnecessarily large dimensions of the pneumatic mail station in the displacement direction, however, it is provided that the blocking detent is designed and/or seated or mounted in such manner that, when the carrying body is displaced into the position aligning with the inward transfer opening, the blocking detent is deflected by means of a lateral limiting wall. Preferably, the blocking detent can be pivoted around a bearing axis which is parallel to the axis of the tube chamber.

In the following, the invention is described on the basis of exemplary embodiments illustrated in five Figures on the accompanying drawing sheets; and other objects, features, and advantages will be apparent from this detailed disclosure and from the appended claims.

A second embodiment of the inventive pneumatic mail station is schematically illustrated in FIG. 3;

FIG. 4 shows a top plan view of the carrying body; and

FIG. 5 shows a section through said carrying body taken as indicated by line V—V in FIG. 3.

DETAILED DESCRIPTION

Figure 1:
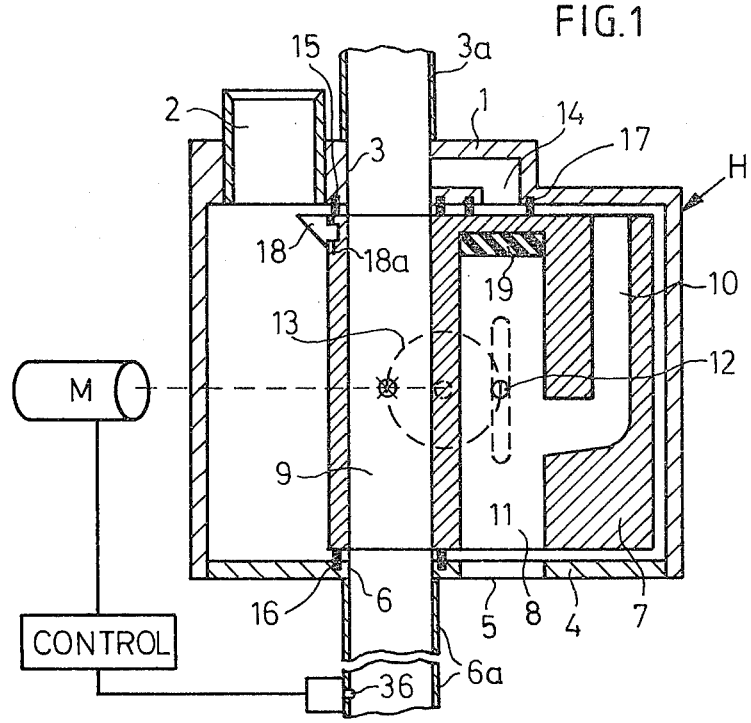
FIGS. 1 and 2 show an embodiment of the inventive pneumatic mail station in two different operating positions of the two tube chambers contained in it.
Figure 2:
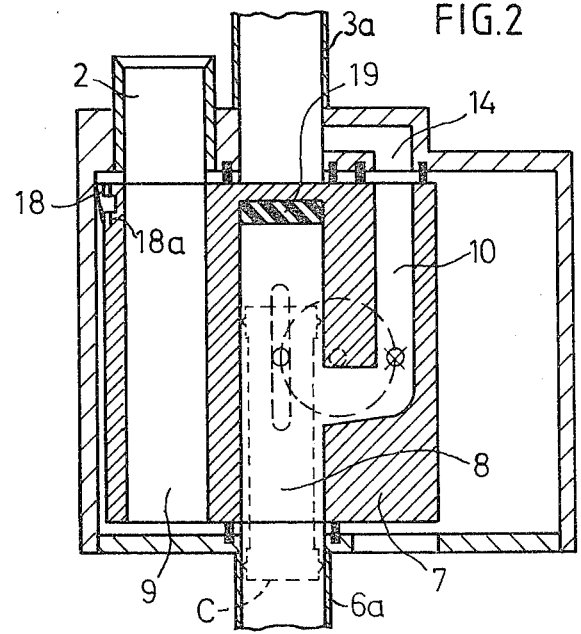

The pneumatic mail station schematically illustrated in FIGS. 1 and 2 has a tube section 2 representing the inward transfer opening, at its upper limiting wall 1 and has a pneumatic tube section 3 for coupling with an outgoing forwarding tube 3a. An outward transfer opening 5 and a pneumatic tube section 6 for coupling with an incoming forwarding tube 6a are situated in the opposite limiting wall 4.

A carrying body 7 in which a first tube chamber 8, a second tube chamber 9 and an air conduit 10 are formed, is displaceably supported at the inside of the pneumatic mail station. The carrying body 7 carries a straight guidance structure 11 into which a dog pin 12 of a crank disk 13 engages. The crank disk 13 and the motor M for driving the disk 13 are secured to the housing H.

Sealing rings 15, 16, 17 which are introduced into grooves of the limiting walls 1, 4 and slide along corresponding end faces of the support body 7 when said support body is displaced, are situated about the perimeters of the tube sections 3 and 6 at the areas confronting the carrying body 7 as well as about the perimeter of a further opening 14 which effects the connection of the tube section 3 to the air conduit 10.

In the position of the two tube chambers 8, 9 illustrated in FIG. 1, a pneumatic dispatch case entering the pneumatic mail station from the top or the bottom can travel through the pneumatic mail station without impediment. It is likewise conceivable that a pneumatic dispatch case previously received in the tube chamber 8 leaves the tube chamber 8 via transfer opening 5 due to the force of gravity (at the moment the tube chamber 8 is driven into the illustrated position) and has fallen into, for example, a collecting basket (not illustrated) situated below the pneumatic mail station.

Insofar as a pneumatic dispatch case to be sent out is introduced into the tube section 2 in the illustrated position of the carrying body 7, said pneumatic dispatch case cannot drop into the space next to the tube chamber 9 but, rather, is prevented from doing so by means of a detent 18 which can be pivoted around an axis 18a which is parallel to the axis of the tube chamber 9.

In the position of the carrying body 7 illustrated in FIG. 2, the tube chamber 9 is in alignment with the tube section 2, whereby the detent 18 has been pivoted out of the plane of the drawing. The pneumatic dispatch case introduced into the tube section 2 for the purpose of being sent out can now drop into the tube chamber 9. The open end of the tube chamber 8 is situated in alignment with the tube sections 6, 6a. The closed end of chamber 8 prevents the through-transit of an incoming pneumatic dispatch case and is provided with an elastic buffer 19 disposed at its closed end. The air stream required for conveying the pneumatic dispatch cases into the pneumatic mail station is maintained via the air conduit 10. The air conduit 10 is now situated in alignment with respect to the opening 14. An incoming pneumatic dispatch case such as indicated at C is driven with full effect up to the location where the air conduit 10 joins with the tube chamber 8. When the leading ring near the front end of the pneumatic dispatch case has reached the area where the air conduit 10 joins with the tube chamber 8, the drive only influences the lower ring near the rear of the pneumatic dispatch case, whereas the full weight of the pneumatic dispatch case continues to oppose the drive. Thus, a slow introduction of the pneumatic dispatch case into its final position at the concussion buffer 19 is effected, particularly due to the air being compressed in front of the pneumatic dispatch case.

The pneumatic mail station schematically illustrated in FIG. 3 essentially differs from the embodiment according to FIGS. 1 and 2 by a different position and design of an air conduit 20 in a linearly displaceable carrying body 21. The air conduit 20 runs between a tube chamber 22 which is open at both ends and a tube chamber 23 whose one end is closed with a concussion buffer 24. The drive of the carrying body 21 again ensues by means of a straight guidance structure such as groove 25 into which the dog pin 26 of a crank disk 27 engages.

The position of the tube sections 28, 29, 30 and 31 relative to the two tube chambers 22, 23 is the same as in FIGS. 1 and 2.

The air conduit 20 is configured in such manner that its upper, open end lies above the tube chamber 23. It is thereby achieved that, when the carrying body 21 is displaced into a position in which the tube chamber 23 is in alignment with the tube section 30, the air conduit 20 has been simultaneously introduced into alignment with tube section 29. Thus, separate sealing rings for the air conduit 20 can be eliminated. The pneumatic mail station is only equipped with two sealing rings 32, 33 for sealing the pneumatic tube path between the two tube sections 29, 30.

A top plan view of the carrying body 21 and a horizontal section through the carrying body 21 illustrated in FIGS. 4 and 5, particularly show the shape and size of the air conduit 20. The lateral openings in the air conduit 20 necessitated by the manufacturing operation are closed by the two cover plates 34 and 35, (shown in an "exploded" or unassembled relation in FIG. 5). The cross-section of the air conduit 20, thus, is greater than the cross-section of the two tube chambers 22, 23.

It will be apparent that many modifications and variations may be effected without departing from the scope of the novel concepts and teachings of the present invention.

I claim as my invention:

1. A pneumatic mail station for the transmission, reception and transit of pneumatic dispatch cases, comprising two tube sections for coupling with an incoming and an outgoing forwarding tube path, wall means providing mutually opposite limiting walls of the pneumatic mail station at which the respective tube sections are located, said wall means having an inward transfer opening means for pneumatic dispatch cases to be sent out and an outward transfer opening means for received pneumatic dispatch cases at the same limiting walls, carrier means disposed between the limiting walls and having a reception tube chamber (8, 23) for the reception of pneumatic dispatch cases which can be introduced into alignment with the tube section associated with the incoming forwarding tube path, said reception tube chamber (8, 23) having closure means effective at one end of the reception tube chamber for creating an air pillow which decelerates an incoming pneumatic dispatch case and an air conduit (10, 20) pneumatically connecting the tube section associated with the incoming forwarding tube path to the tube section associated with the outgoing forwarding tube path in the reception position of the reception tube chamber (8, 23), characterized in that the reception tube chamber (8, 23) has said closure means at the end thereof closer to the outgoing forwarding tube path, said carrier means having a second tube chamber (9, 22) which extends parallel to the reception tube chamber (8, 23) and is displaceable in common with it, said second tube chamber (9, 22) being in alignment with the two tube sections (3, 29; 6, 30) in one position and being in alignment with the inward transfer opening means in another position; and in that the air conduit (10, 20) joins at one end with the reception tube chamber (8, 23) and can be displaced in common with said reception chamber (8, 23) and the second tube chamber (9, 22) in such manner that, given the position of the second tube chamber (9, 22) in alignment with the two tube sections, the communication of the air conduit (10, 20) at least with the tube section (3, 29) associated with the outgoing forwarding tube path is blocked but, in contrast thereto, is released at the position of the reception tube chamber (8, 23) in alignment with the two tube sections.

2. A pneumatic mail station according to claim 1, characterized in that the tube section (6, 30) for the incoming forwarding tube path is disposed at the lower limiting wall (4) so that an incoming pneumatic dispatch case enters the reception chamber (8, 23) from below.

3. A pneumatic mail station according to claim 1, characterized in that the air conduit (10, 20) enters the reception tube chamber (8, 23) close to the open end of said reception tube chamber.

4. A pneumatic mail station according to claim 1, characterized in that said carrier means comprises a carrying body (7, 21) having end faces parallel to the adjacent limiting walls at least adjacent the open ends of the two tube chambers.

5. A pneumatic mail station according to claim 4, characterized in that sealing rings (15, 32;16, 33) encompassing the tube sections associated with the incoming and outgoing forwarding tube paths are disposed at the limiting walls.

6. A pneumatic mail station according to claim 5, characterized in that annular grooves in the limiting walls accept the sealing rings.

7. A pneumatic mail station according to claim 5, characterized in that the sealing rings are pressed against the end faces of the carrying body (7, 21).

8. A pneumatic mail station according to claim 1, characterized in that the reception tube chamber has a shorter length than the second tube chamber and the region between the closure means of the reception tube chamber and the limiting wall having the tube section for the outgoing forwarding tube path is at least partially incorporated into the air conduit.

9. A pneumatic mail station according to claim 4 characterized in that the carrying body is substantially comprised of a single-piece structural part in which the air conduit is also worked out in addition to the two tube chambers.

10. A pneumatic mail station according to claim 9, characterized in that the air conduit (20) is formed at least partially in the area between the two tube chambers (22, 23).

11. A pneumatic mail station according to claim 10, characterized in that the air conduit (20) exhibits cross-sectional dimensions which increase proceeding from its central area.

12. A pneumatic mail station according to claim 4, characterized in that the carrying body (7) is mounted by the wall means and driven so as to be linearly displaceable.

13. A pneumatic mail station according to claim 12, characterized in that the carrying body (7) has straight guidance means, and drive means therefor comprises a crank disk (13) having a dog (12) engaged with said guidance means.

14. A pneumatic mail station according to claim 1, characterized in that the distance between the axes of the two tube chambers is identical to the distance between the axis of the inward transfer opening and the axes of the tube sections.

15. A pneumatic mail station according to claim 1, characterized in that the distance between the axes of the two tube chambers is identical to the distance between the axis of the outward transfer opening and the axis of the tube section associated with the incoming forwarding tube path.

16. A pneumatic mail station according to claim 4, characterized in that the carrying body carries a blocking detent (18) in the area of its end face facing the limiting wall exhibiting the inward transfer opening means, said blocking detent (18) projecting at least slightly into blocking relation to the inward transfer opening means in a transit position of the carrying body.

17. A pneumatic mail station according to claim 16, characterized in that the blocking detent (18) is constructed and arranged in such manner that, when the carrying body is displaced into a reception position with the second chamber in alignment with the inward transfer opening, the blocking detent is deflected by means of a lateral limiting wall.

18. A pneumatic mail station according to claim 17, characterized in that the blocking detent (18) has a pivot axis which is parallel to the axis of the second tube chamber.

19. A pneumatic mail station according to claim 1, characterized in that a contact which can be actuated by pneumatic dispatch cases is disposed at least in the vicinity of the second tube chamber in a transit position of the carrier means.

20. A pneumatic mail station according to claim 1, characterized in that the closure means of the tube chamber (8) has an elastic buffer (19, 24).

21. A pneumatic mail station for the transmission and reception of pneumatic dispatch cases, comprising tube section means for coupling with incoming and outgoing forwarding tube paths, wall means having inward and outward transfer opening means for pneumatic dispatch cases to be send out and for received pneumatic dispatch cases, carrier means mounted by the wall means for movement between first and second positions, and having a reception tube chamber operable in the first position of the carrier means for the reception of pneumatic dispatch cases, said reception tube chamber having an open end disposed in alignment with the tube section means in the first position of the carrier means for the reception of a dispatch case arriving via the incoming forwarding tube path, said reception tube chamber having a closed end for creating an air pillow which decelerates an incoming pneumatic dispatch case and having an air conduit pneumatically connecting with the reception tube chamber between its open and closed ends, and means comprising said air conduit for accomodating air flow toward said reception tube chamber in the first position of said carrier means.

* * * * *